Patented May 12, 1925.

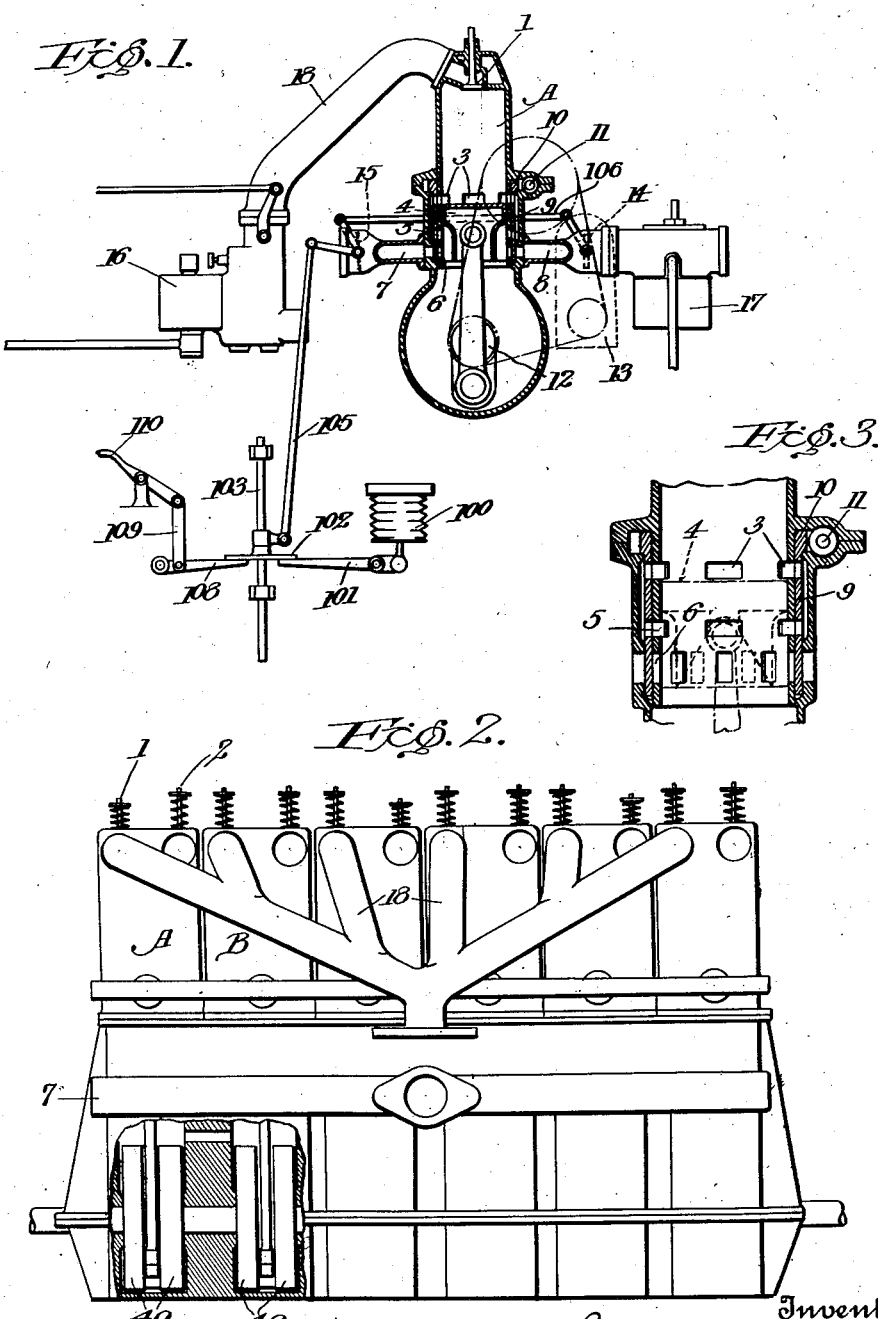

1,537,616

UNITED STATES PATENT OFFICE.

GRENVILLE MELLEN, OF CRANFORD, NEW JERSEY.

INTERNAL-COMBUSTION ENGINE.

Application filed September 11, 1918. Serial No. 253,629.

*To all whom it may concern:*

Be it known that I, GRENVILLE MELLEN, a citizen of the United States, residing at Cranford, in the county of Union and State of New Jersey, have invented certain new and useful Improvements in Internal-Combustion Engines, of which the following is a specification.

My invention relates to means for maintaining the power of aeroplane engines at varying altitudes, and has for its purpose to provide such engines with means for compensating for diminution of power as the aeroplane rises into regions of lower barometric pressure.

At higher altitudes the barometric pressure is less, and there is a smaller quantity of air, i. e. a less amount of oxygen, in a given volume, so that the power of the explosion is less than at sea-level, since there is not the same quantity of oxygen in the combustion chamber as at sea-level, and the density of the explosion gases is less.

My invention therefore comprises means for automatically supplying to the combustion chamber in augmentation of the normal charge, an additional charge of oxygen, preferably as compressed air, to produce a powerful explosive mixture; or for automatically increasing the supply to the cylinder of additional excess air and gasoline vapor; or for automatically increasing the supply to the cylinder of explosive mixture. My invention further includes the feature of supplying to the cylinder of the engine gas of such density as to insure the presence in the cylinder chamber of gas in sufficient mass to insure an effective explosion stroke.

I prefer to use, in the practical embodiment of this invention, an engine of the four-stroke cycle type having multiple pairs of engines with the pistons of each pair connected to the same crank, and arranged in such manner that the compression of the supercharge of air or explosive mixture is effected by each pair of pistons in the same crank case. Such an engine is disclosed in detail in my application Ser. No. 214,562, filed January 30, 1918.

In the present application I have illustrated diagrammatically such an engine, together with the automatic barometrically operated device by which the additional gaseous mixture or air, "the supercharge" is controlled.

In the drawings,—

Figure 1 is a diagram of the system, the engine being shown in section.

Fig. 2 is an elevation of the engine with a portion of the crank casing broken away.

Fig. 3 is a detail of the rotatable sleeve valve and connecting ports.

Referring to the drawings, A is one of the engine cylinders, having inlet valve 1 and exhaust valve 2 at its upper portion, and port openings 3, located just above the top of the piston 4 when at its lowermost position. The cylinder has an extension or skirt having two sets of port openings 5, 6, the upper ports 5 opening into an annular chamber in the casing, connecting with the port openings 3 in the cylinder, and the lower port openings 6 arranged to communicate, when the corresponding ports in the sleeve valve are in register, with the chambers 7 or 8, through which the supercharging gas is admitted. The sleeve valve 9 is constantly rotated by means of a gear 10 at its top meshing with a pinion on the cam shaft 11, from which the inlet and exhaust valves are operated in the usual manner, this cam shaft 11 being driven at the usual 1-2 ratio, from the crank shaft 12 by a chain, as shown in dotted lines, this chain also driving the shaft of the magneto 13. The chambers or manifolds 7 and 8 are connected at their inner ends to the ported upper portion of the crank-case, and are provided with valves 14, 15 for controlling the quantity of explosive mixture or air admitted to the crank case. A carburetor 16 is connected to a manifold, from which supply pipes 18 lead to the inlet valves of each cylinder; and a second carburetor 17 is connected to the manifold 8 to supply fuel to the crank-case chamber. The crank shaft is provided with filling disks 40, arranged to diminish the free space in the crank cases as much as possible. The open ends of each pair of cylinders are connected to the same crank case, so that the volume of explosive mixture or air sucked in by the two pistons on their upward stroke is subsequently compressed upon their downward stroke into the relatively small free space in the crank case, thereby securing an adequate compression of a double volume of gas into a common reservoir, from which the supercharge is delivered to each of the paired cylinders in succession at a higher maintained rate of flow than if the supercharge were drawn from a crank case connected to a single cylinder.

The barometric control device may consist of an air-tight chamber 100 having a corrugated wall, one end of the chamber being fixed and the other connected to a lever 101, whose outer end engages a lug or projection 102 on a sliding rod 103, to which lug is pivoted a link 105 secured to the operating arm of a butterfly valve 15 in the inlet pipe of the gas manifold 7 through which air is supplied to the crankcase. In order to permit of independent control by the operator a lever 108, also engaging the lug 102, may be connected by link 109 to pedal-lever 110. Either automatic or manual control is thus permitted.

As shown the crank case is provided with duplicated means for admitting a charge thereto, one of such admission means being provided with a carburetor. Either air or explosive mixture may thus be introduced into the crank case. As illustrated, the barometric device 100 controls the settings of both valves 14 and 15, since the valves are connected by a link 106, but it is obvious that the barometric device may be arranged to operate but one valve or it may control both valves but through independent connections.

In operation of my invention, the carburetor 16 and its air supply are carefully adjusted to provide for the adequate engine power at sea-level or any desired altitude representing standard atmospheric conditions, the crank-case gas admission valve being set to admit only such amount of air that at sea level, there will be little if any compression in the crank case. It will be evident that as the aeroplane rises this carburetor adjustment will provide a mixture which will be too rich at the higher levels where there is less air and hence less oxygen. The automatic pressure device will, however, by admitting additional air and fuel to the crank case, supply an additional and denser mixture, and where air or lean mixture is used the additional oxygen for more nearly complete combustion of the fuel or fuel-vapor is provided.

Further, it has been demonstrated in practice that by supplying, as from a carburetor to the crank case, a properly regulated mixture of vaporized fuel and air and delivering this compressed supercharge to the cylinders in the manner described, the engine can be made to develop from 30% to 40% additional power, for the reasons described in a recent application filed by me on September 11, 1918, Ser. No. 253,630 relating to mechanism for obtaining supercharge.

My invention therefore also comprises the feature of automatically or manually putting into operation the fuel mixture supercharge mechanism.

While it has heretofore been suggested to use crank-case compression of a fuel-gas mixture, the compressed mixture has been introduced into the cylinders not only at the end of the suction or admission stroke, but also at the end of the explosion stroke to assist in scavenging. I have found that the use of the compressed gas for scavenging is not only unnecessary, but is detrimental in that it lessens the gas pressure in the crankcase and therefore does not afford the desirably high compression to force the supercharge rapidly from the crank case during the necessarily short time that the lower or supercharge admission ports are open.

The cycle of operation of this engine is as follows:—Designating one cylinder by A and the other by B, and keeping in mind that both are connected to one crank, and to a common crank case, when as explosion or power stroke occurs in A, both pistons move inward toward the crank case, the valves in A all being closed, while in B, the normal inlet valve 1 is open and the exhaust valve 2 closed and the normal charge of explosive gas is sucked into cylinder chamber B. When the pistons arrive near the end of their inward stroke, the sleeve valve admits compressed gas (explosive mixture or air or both) from the crank case, through port 5 into annular chamber 20 and port 3 into cylinder B; but no connection is made between the crank case and cylinder A. During this same inward stroke, the admission ports, 6, into the crank case have been kept closed, so that the gas in the crank case has been compressed.

On the succeeding outward stroke the explosion gases in A are exhausted through its now opened exhaust valve 2, and the entire charge (normal and pressure supercharge) in B is compressed. Also at the beginning of this outward stroke, the admission ports 6 into the crank case have been opened, so that a quantity of air or explosive mixture equal in volume to that of two piston displacements less the residual amount which has remained undelivered on the previous supercharge delivery has been sucked into the crank case.

On the next inward stroke, which is caused by the explosion of the compressed charge in B, there are admitted into A, a normal charge through its normal inlet valve and a supercharge from the crank case, the charge in the crank case being compressed during the stroke. On the fourth or outward stroke of the cycle, the explosion gases are driven out of B, without any communication having been established between it and the crank case, the charge in A is compressed, and a fresh charge is sucked into the crank case.

In practice, it is preferable to provide filling plates on the crank shaft, so that the free space within the crank case proper is reduced to a minimum, and the charge is compressed therein to obtain a maximum compression pressure in this crank case cavity. Preferably also sleeve valves are used, as they permit the use of relatively large port openings and avoid exhaust gas pockets, which are features of particular importance shown in my other applications above referred to, in that the time during which these ports are open, is comparatively short. Such valves can moreover be made to effectively close the ports so that there is no loss of compression, and by proper location can readily be given the proper timing to enable the supercharge inlet, the normal inlet and exhaust ports to open and close in such relation as to give the best results.

My invention thus provides means for maintaining the power of an aeroplane engine at varying altitudes, since by means of the compression of the double cylinder volume of the charge into the restricted free space in the crank case, there is provided a considerable volume of the charge under superatmospheric pressure sufficient to cause a vigorous and rapid flow of the compressed supercharge into the lower end of the cylinder, thus insuring that the cylinder space is not only completely filled with a charge, but with a charge under superatmospheric pressure to thus compensate for the lesser density of the normal charge.

I claim:

1. The method of maintaining the power of internal combustion engines under varying atmospheric pressure which consists in supplying to the engine a normal charge appropriate for standard atmospheric pressure conditions and separately supplying in addition to the said normal working charge a supercharge under pressure, the quantity of such supercharge being automatically varied to correspond with the variations in atmospheric pressure.

2. An internal combustion engine having means for admitting to the cylinder, at the end of the fuel suction stroke, in addition to the normal working charge of explosive mixture, a supercharge, means for compressing the supercharge, and barometrically actuated means for regulating the quantity of such supercharge in accordance with variations in atmospheric pressure.

3. An internal combustion engine having means for admitting to the cylinder a normal working charge of explosive mixture appropriate for standard atmospheric pressure conditions and means for separately supplying in addition to the normal working charge a supercharge of explosive mixture, means for compressing the supercharge and barometrically actuated means for regulating the quantity of such supercharge in accordance with variations in atmospheric pressure.

4. An internal combustion engine having means for admitting, in addition to and separately from the normal working charge of explosive mixture, a supercharge of air including means for compressing the air and barometrically actuated means for regulating the quantity of such air in accordance with variations in atmospheric pressure.

5. An internal combustion engine having means for admitting, in addition to and separately from the normal working charge of explosive mixture, a supercharge of air and a supercharge of air and fuel including means for compressing the said supercharges, and barometrically actuated means for regulating the quantity of the supercharges in accordance with variations of pressure.

6. An internal combustion engine having means for admitting, in addition to and separately from the normal working charge of explosive mixture, a supercharge, barometrically actuated means for regulating the quantity of the supercharge, and means for independently regulating the quantity of the supercharge.

7. An internal combustion engine of the 4-stroke cycle crank-case compression type having two cylinders whose pistons are connected to the same crank, means for admitting a compressed charge from the crank case alternately into each cylinder near the end of its normal fuel-charge suction stroke, means for excluding said compressed charge from the cylinder during the remainder of the cycle, and barometrically actuated means for automatically varying the quantity of the compressed charge admitted into the cylinders, in accordance with variations in atmospheric pressure.

In testimony whereof, I affix my signature.

GRENVILLE MELLEN.